United States Patent [19]

Cornell

[11] 4,042,647

[45] Aug. 16, 1977

[54] LATEX SUSPENSION PROCESS AND GRAFT POLYBLEND COMPOSITION USING SMALL PARTICLE SIZE SPINE

[75] Inventor: Robert J. Cornell, Naugatuck, Conn.

[73] Assignee: Uniroyal, Inc., New York, N.Y.

[21] Appl. No.: 560,988

[22] Filed: Mar. 21, 1975

[51] Int. Cl.$^2$ ............................................. C08L 25/10
[52] U.S. Cl. ........................... 260/880 R; 260/876 R
[58] Field of Search .................................. 260/876 R

[56] References Cited

U.S. PATENT DOCUMENTS

| | | | |
|---|---|---|---|
| 3,010,936 | 11/1961 | Irvin ................. | 260/876 R |
| 3,073,798 | 1/1963 | Baer .................. | 260/876 R |
| 3,624,183 | 11/1971 | Leach et al. ....... | 260/876 R |
| 3,793,403 | 2/1974 | Dalton et al. ...... | 260/876 R |
| 3,819,762 | 6/1974 | Howe ................ | 260/876 R |
| 3,851,014 | 11/1974 | Dalton ............... | 260/876 R |
| 3,887,652 | 6/1975 | Carrock et al. ..... | 260/880 R |

*Primary Examiner*—Carman J. Seccuro
*Attorney, Agent, or Firm*—Anthony Lagani, Jr.

[57] ABSTRACT

Disclosed is a novel polybutadiene or butadiene-styrene copolymer based gum plastic having excellent impact strength and a method for its preparation. The use of small particle size (SPS) spine latex in a latex-suspension process gives unexpectedly good properties by yielding an ABS with at least about 85% of the rubber present as particles within a specified and relatively narrow size range, i.e., 0.04–0.25µ and having a number average particle size less than 0.14µ. In the method of preparation, the latex spine and monomers are converted directly to the final product by a conventional suspension process.

9 Claims, 1 Drawing Figure

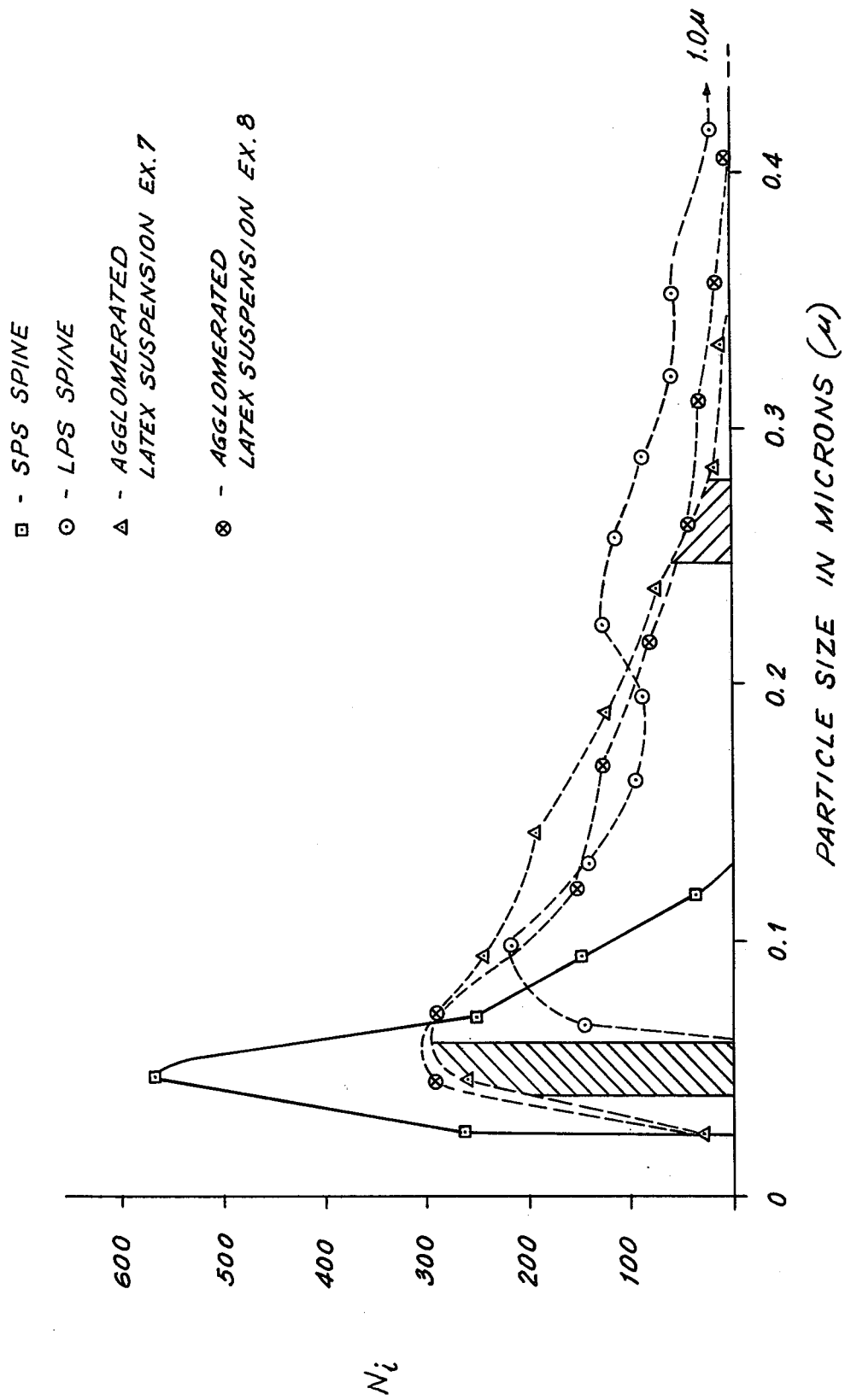

LATEX SUSPENSION PROCESS AND GRAFT POLYBLEND COMPOSITION USING SMALL PARTICLE SIZE SPINE

CROSS REFERENCE TO RELATED APPLICATIONS

This application is related to, and incorporates by reference, application Ser. No. 560,783, entitled ABS COMPOSITION HAVING IMPROVED IMPACT STRENGTH AND WEATHER AGING RESISTANCE AND LATEX SUSPENSION PROCESS THEREFOR of Robert J. Cornell, which application is being filed concurrently herewith.

BACKGROUND OF THE INVENTION

1. Field of the Invention

The invention relates to novel compositions, and in particular, to tough impact resistant ABS polymers having a relatively narrow particle size range and process therefor.

2. Description of the Prior Art

In the last several years, numerous U.S. and foreign patents have issued involving latex suspension processes. None of these patents, which are described below suggests the unexpectedly excellent properties obtained by using small particle size spine in the latex-suspension processes. Small particle size spine, hereinafter referred to as "SPS spine" as used herein is meant to signify a spine prepared by conventional emulsion techniques, and consisting of rubber particles from about $0.02-0.14\mu$ in diameter with at least 60% less than $0.07\mu$ in diameter. A large particle size spine hereinafter referred to as "LPS spine" as used herein is meant to signify a spine prepared by conventional emulsion techniques, and consisting of rubber particles from about $0.05-1.00\mu$ in diameter.

British Patent No. 1,299,268 discloses a process wherein an 80/20 spine/resin graft latex is added to styrene and acrylonitrile monomers, the latex is coagulated and the water phase is separated. The resulting cement of monomers soaked up in the graft is polymerized in bulk. The reference discloses that polymerization may also be performed using suspension techniques.

In U.S. Pat. No. 3,751,526 there is described a process, involving the addition of a spine latex to monomers followed by coagulation and separation of the water phase. The polymerization is run in bulk. No disclosure at all is made of the use of either an 80/20 spine/resin graft latex or the ability to carry out the polymerization using suspension techniques.

U.S. Pat. No. 3,637,555 merely discloses new stabilizer systems for ABS, but in the disclosure there is cross-reference to a co-pending application, Ser. No. 748,656, involving the use of an 80/20 spine/resin graft latex in a latex-suspension process. Counterparts of this co-pending application have been issued in Canada (877,378), Britain (1,253,242) and France (2,014,012).

In British Pat. No. 1,253,242 a latex-suspension process somewhat similar to the present latex-suspension process is disclosed. The process involves addition of monomers and a graft latex to a suspending solution. However, no reference is made to using a spine latex in the process, nor is any mention made of the enhancement of the properties of the product by using a specific particle size.

In British Patent No. 1,315,513 the latex-suspension process is the same as described in British Patent No. 1,253,242 except that the monomer system is styrene and methyl methacrylate.

Japanese patent publication 47/47864 describes a process wherein styrene/acrylonitrile monomers are bulk polymerized to 1-45% monomer conversion, after which a spine or a graft latex is added to the bulk polymerized monomers and the mixture is suspended, followed by the addition of a second portion of spine or graft latex and finally, by polymerization of the entire mass to form beads. If the bulk polymerization step is run to 1% conversion and the latex added after the addition of the suspending solution, the final process is almost identical to the process described in British Pat. No. 1,253,242.

French Patent No. 2,148,171 describes a process similar to British Patent No. 1,253,242 except for the use of spine latex in place of graft latex.

U.S. Pat. No. 3,370,105 describes a latex-suspension process which involves addition of spine latex to monomers, complete coagulation of the latex and vigorous agitation to obtain the desired particle size in the suspension stage. Polymerization is initiated after coagulation in this process.

In Japanese patent publication 48/05870 there is described a latex suspension process which involves adding a spine latex to the monomers and coagulatiing the mixture in the presence of an acid followed by the addition of base and suspending solution.

British Patent No. 1,356,926 describes a suspension polymerization process wherein an additive such as phosphoric acid is added to the polymerization mass to coagulate, or destroy the stability of the rubber latex after which the suspension is polymerized.

Finally, it is known, from U.S. Pat. Nos. 3,793,403 and 3,573,243 that SPS spine may be agglomerated either chemically or by pressure. The agglomerated spine is thereafter used in standard emulsion polymerizations, but not in latex suspension processes.

The preparation of tough, impact resistant plastics by the grafting of resin-forming monomers onto elastomeric spines is well known. Examples of such materials which are prepared commercially are high impact polystyrene and ABS polymers. The latter materials, for example, are graft copolymers of styrene and acrylonitrile on butadiene elastomers such as SBR (styrene-butadiene rubber) or polybutadiene. More precisely, the ABS polymers are comprised of (1) a continuous phase consisting essentially of styrene acrylonitrile copolymer, and (2) a disperse phase consisting essentially of butadiene (or SBR) elastomer uniformly dispersed throughout the continuous phase. The graft copolymer provides cohesiveness to the system by overcoming the incompatibility of the resin and the elastomer with each other.

ABS polymers have been prepared for many years by carrying out the polymerization by an aqueous emulsion process (U.S. Pat. Nos. 2,802,808; 2,820,773 and 2,994,683). The rubber latex is thereby grafted with styrene and acrylonitrile with the simultaneous in situ, formation of ungrafted styrene-acrylonitrile copolymer.

Adjustment to the desired rubber level for specific properties is made either in the initial recipe or by the addition of varying amounts of free styrene-acrylonitrile emulsion latex. The resulting latex is then flocced, dried and compounded.

BRIEF DESCRIPTION OF THE DRAWING

The sole FIGURE is a graph showing the particle size distribution of the product of the invention as compared with the particle size distribution of the starting SPS spine and that of large particle size (LPS) spine.

SUMMARY OF THE INVENTION

According to the process of the invention, the novel ABS composition is prepared via a latex-suspension process, starting with a cross-linked rubber latex and mono-ethylenically unsaturated monomers. This latex-suspension process is more desirable from an economic standpoint than the standard emulsion process because it eliminates the costly floccing step. The floccing of an emulsion latex results in extremely high level of pollutants and treating of these effluents adds considerably to the overall manufacturing costs of the product. Moreover, according to the prior art, it has been thought necessary, in order to achieve good impact strength, that such ABS compositions contain a certain amount of LPS material. Unexpectedly, however, it has now been found that the use of less expensive SPS spine latex in a latex-suspension process leads to ABS polymers exhibiting excellent impact strength. In contrast, the use of an SPS spine in a standard emulsion polymerization results in a material having poor impact strength. Agglomeration occurs during the latex suspension process in which no more than 50% of the rubber particles have a particle size less than $0.07\mu$ and at least 85% of the rubber present lies within a relatively narrow size range of 0.04 to $0.25\mu$ and having a number average particle size less than $0.14\mu$; with at least about 95% being between 0.04 and $0.30\mu$ and at least about 98% being between 0.04 and $0.4\mu$ in diameter. In comparison a standard LPS spine used in a conventional emulsion process gives a product having rubber particles of which about 72% are between 0.04 and $0.25\mu$ and about 83% are between 0.04 and $0.30\mu$ in diameter.

The cross-linked rubber latex is preferably an SPS spine comprising butadiene rubber or styrene-butadiene rubber, the ratio of styrene to butadiene being within the range of from about 31/69 to 0/100, preferably in the range of about 0/100 to 10/90, and most preferably, 7/93. This SPS spine is not itself novel, and may be prepared, for example, as described in "Synthetic Rubber" by Whitby (1954); chap. 8, Emulsion Polymerization Systems (C. F. Fyling), page 228 where a formulation for a 9/91 styrene-butadiene rubber latex is given.

Generally, the degree of cross-linking (gel) of the spine, in percent gel as determined in benzene, varies between about 50% and 98%. Preferably, it is between about 80 and 90%. The particle size of the cross-linked small particle size spine is about 0.02 to $0.14\mu$.

The monoethylenically unsaturated monomers which may be used include monovinylidenic aromatic hydrocarbons such as styrene, α-methylstyrene and substituted styrenes such as o-methylstyrene, m-methylstyrene, p-methylstyrene, o,p,m-ethylstyrenes, 2,5-dichlorostyrene, o,p-dimethylstyrenes; alkenoic acids such as acrylic acid and methacrylic acid; alkenoic esters such as methyl acrylate, ethyl acrylate, butyl acrylate, methyl methacrylate, ethyl methacrylate and butyl methacrylate; alkenoic nitriles such as acrylonitrile and methacrylonitrile; vinyl esters such as vinyl acetate and vinyl propionate; vinyl ethers such as ethyl vinyl ether; vinyl chloride; vinyl pyridine; methyl vinyl pyridine; and esters of maleic and furmaric acids. The monomer may be used alone or in combination with one or more of the other monomers. The preferred monomers are styrene and acrylonitrile.

In preparing ABS polymers, the preferred ratio of total styrene to total acrylonitrile may suitably vary within the range of from about 80/20 to about 60/40. A particularly preferred ratio is about 70/30.

The suspension polymerization reaction according to the invention can be initiated thermally or with an initiator, such as a peroxide or an azo initiator, for example, diacryl peroxides such as benzoyl peroxide, aliphatic diacyl peroxides such as lauroyl peroxide, alkyl peroxy esters such as t-butyl peroxypivalate, t-butyl peroctoate, t-butyl perbenzoate, t-butylperoxyneodecanoate or alkylperoxides such as di-t-butyl peroxide. Azo initiators such as azo-bis-isobutyronitrile can also be used. Various combinations of these initiators may also be used.

Specific catalyst systems (initiators) which have been found to be particularly effective for producing ABS polymers are t-butyl peroxypivalate or a mixture thereof with lauroyl peroxide. Other catalysts which have been found to be suitable are lauroyl peroxide, benzoyl peroxide and azo-bis-isobutyronitrile.

The amount of initiator to be used in the suspension polymerization is generally from about 0.1 to about 0.5% by weight based on the weight of the polymerization mass when a single initiator is used, and from 0.05 to 0.25% by weight of each when a mixture of two or more initiators is used. Preferably, 0.2 to 0.3% by weight of a single initiator is used and 0.2% by weight of each are used, when a combination of initiators are employed.

According to the process, the monomers, which, in a preferred embodiment are styrene and acrylonitrile are added, optionally, together with an aromatic oil, such as Sunthene 250 (Sun Oil Co.) to a reactor. The aromatic oil is exemplary of a broad class of lubricants which it is generally desirable, although not essential, to add to the polymerization mass in order to improve the flow and moldability of the composition. Other such suitable lubricants include, e.g., refined mineral oils, mixtures of paraffin wax and hydrocarbon oils, or ester lubricants such as butyl stearate. The lubricant, when added, is generally used in an amount of 1-6, preferably, 3 parts per hundred parts of polymer.

To the reactor, there are then added the following with stirring: the SPS spine latex (described above), 0.01 to 1.0% by weight of a chain transfer agent, for example, a mercaptan, such as t-dodecyl mercaptan. The preferred chain transfer agent is 0.01 to 1.0% of a mixture of mercaptans known as mixed tertiary mercaptans (consisting of 60% dodecyl — 20% tetradecyl — and 20% hexadecyl mercaptans). Also added are the initiator, and an antioxidant system.

The antioxidant system may be a hindered phenol such as Naugawhite in an amount of 0.01 to 1.2%, either alone, or in combination with di-tridecyl thiodipropionate (DTDTDP) in an amount of 0.1 to 3% by weight based on the weight of the pre-polymerization mass. Other phenolic antioxidants which may be used include, for example, 2,2'-methylenebis-(4-ethyl-6-t-butylphenol); 2,6,-di-t-butyl-4-methylphenol; and 4,4'-thiobis-(2,6-di-t-butylphenol). Also, an alkaryl phosphite such as tris-nonylphenyl phosphite may be used as the antioxidant.

To the resulting mixture, the suspending solution is added. Alternatively, the previously described mixture of materials (prepolymerization mass) can be added to the suspending solution.

The suspending solution is an aqueous solution of a suspending or dispersing agent and can be any one or more of a variety of water soluble dispersing agents known to the art, such as alkali salts of sulfonated polystyrene, sulfonated polyvinyl toluene, polyacrylic acid, polyacrylamide, methyl cellulose, hydroxyethyl cellulose, interpolymers of acrylic or methacrylic acid with 2-ethyl hexylmethacrylate, carboxymethyl methyl cellulose, and polyvinyl alcohol. The use of alkali salts, such as sodium chloride, EDTA.Na$_x$ ($x=1-3$) and Sulframin 45s (40% sodium n-dodecylbenzene sulfonate, 5% sodium xylenesulfonate and 55% water) can be used alone or in combination with the above dispersing agents to improve suspension stability.

A preferred suspending system contains hydroxyethyl cellulose (Natrosol 250HR sold by Hercules) and ethylene diamine tetraacetic acid, tri-sodium salt (EDTA.Na$_3$). The mixture can be used in amounts corresponding to from 0.2 to 2.0 parts of Natrosol 250HR and 0.06 to 0.6 part EDTA.Na$_3$ per hundred parts of polymer. The preferred range is from 0.45 to 0.90 part Natrosol 250HR and 0.15 to 0.30 part EDTA.Na$_3$. Another preferred suspending system based on polyvinyl alcohol (PVA) contains 0.1 to 0.4 part of PVA (Elvanol 50-42; Du Pont), 0.08 to 0.32 part NaCl and 0.06–0.24 part Sulframin 45s. In general, an amount of the aqueous solution corresponding to from 1 to 3 times, preferably, 2 times the weight of the polymer is employed.

The polymerization mass may be prepared by addition of the SPS spine latex, monomers, chain transfer agent, antioxidant and initiator to the reactor. The suspending system is added and suspension polymerization is run to completion for about 20 hours at 105°-250° F.

A suitable alternative procedure is to dissolve the initiator, chain transfer agent and aromatic oil (if used) in the styrene and charge the solution to the reactor, after which the acrylonitrile is added. The SPS spine latex and the suspending solution are then added.

The prepolymerization mass is polymerized by a conventional suspension process in which the polymerization is carried out in the absence of air or oxygen. Excellent results are obtained using t-butyl peroxypivalate alone or in combination with lauroyl peroxide as the initiator at 150°-185° F.

The substantially completely polymerized beads are separated from the suspension water by any of the conventional methods, such as screening, sedimentation or centrifuging. They are then dried, extruded, pelletized, and packaged.

The composition according to the invention consists essentially of a polyblend of a. a matrix of a copolymer consisting at least principally of a monovinylidenic aromatic hydrocarbon, preferably styrene, and an ethylenically unsaturated nitrile, preferably acrylonitrile, and
b. a graft copolymer comprising a graftable rubber substrate containing a diene monomer component selected from the group of diene rubbers, preferably butadiene/styrene rubber, and a superstrate of a copolymer consisting at least principally of a monovinylidenic aromatic hydrocarbon, preferably styrene and an ethylenically unsaturated nitrile, preferably acrylonitrile, the degree of grafting (G) on the rubber substrate, being defined as the ratio of the weight of the grafted copolymer to the weight of rubber substrate, generally varying in the range of from about 0.3 to 1.3, preferably between 0.5 and 1.0 and most preferably between 0.6 and 0.9. The rubber substrate has particles no more than 50% of which are less than 0.07$\mu$ in diameter, at least 85% of which are 0.04 to 0.25$\mu$ in diameter, with at least about 95% of the particles being 0.04 to 0.30$\mu$ and at least about 98% being 0.04 to 0.4$\mu$ in diameter. The superstrate has an intrinsic viscosity of 0.30 to 1.2 at 30° C. in dimethyl formamide.

The ratio of monovinylidenic aromatic hydrocarbon to ethylenically unsaturated nitrile may range from about 80/20 to about 60/40, and preferably is about 70/30.

The rubber substrate preferably comprises butadiene or styrene-butadiene rubber. The styrene to butadiene ratio in the SBR may vary within the range of from about 31/69 to 0/100, preferably, the range is 0/100 to 10/90. Generally, the degree of cross-linking of the spine varies between about 50 to 98%, preferably, between about 80 to 90%.

The level of rubber substrate may range from about 5% to about 40% by weight. Those polyblends containing high rubber levels can be blended back with, for example, styrene/acrylonitrile resin to reduce the final rubber level. The preferred level of rubber substrate is between 7 and 18% by weight.

DESCRIPTION OF THE PREFERRED EMBODIMENTS

The following examples are given to illustrate the invention without, however, limiting the scope thereof.

EXAMPLE 1

This example describes, in detail, the basic experimental procedure followed in the latex suspension process. This specific run is the first in a series (Table 1) in which the final rubber level is varied from 9% to 15% by weight.

The following materials were used in the example.

| Material | Amount |
| --- | --- |
| SPS spine[1] | 15 gm. |
| Styrene | 59.5 gm. |
| Acrylonitrile | 25.5 gm. |
| Sunthene 250 | 3 gm. |
| Mixed tertiary mercaptans | 0.48 gm. |
| Ditridecylthiodipropionate | 0.45 gm. |
| Naugawhite ® | 0.15 gm. |
| t-butyl peroxypivalate | 0.20 gm. |
| 0.6% Suspending Solution (0.45% Natrosol 250HR, and 0.15% EDTA. Na$_3$) | 200 gm. |

[1]SPS Spine: 93% butadiene/7% styrene produced by fast cycle hot emulsion polymerization process. Particle size of the spine is 0.02$\mu$ to 0.14$\mu$.

The procedure was performed as follows:

The styrene, acrylonitrile and Sunthene 250 were added to the reactor. The SPS spine latex, mixed tertiary mercaptans, ditridecylthiodipropionate, Naugawhite and t-butyl peroxypivalate were added to the reactor with stirring. The order of addition of these materials to the monomers is not critical.

To this mixture, under an inert atmosphere, the suspending solution is added. Using medium speed (about 100–250 rpm) for agitation, a fine uniform dispersion is obtained. The polymerization is then run for 20 hours at 160°-165° F. after which the obtained beads were then isolated by filtration, washed with distilled or deionized water and air dried at 165° F. for 24 hours.

Normal compounding conditions involve heating the beads in a 350° F. press for 5 minutes, followed by milling at 320° F. for 10 to 15 minutes. The beads can be milled directly without affecting their mechanical properties. Test specimens were then compression molded at 350° F.

The properties of the obtained product are set forth in Table II below.

In Table I, there are given data for the recipes of Examples 2-8 (in addition to repeating the recipe for Example 1).

ing solution. The particle size distribution of the products of Examples 7 and 8 are shown in the drawing.

The properties of the products of Examples 1-8 are set forth in Table II. The data in Table II demonstrate the ability to obtain ABS having excellent mechanical properties according to the invention. The preferred rubber level lies between 7 to 18% but the rubber level can be from about 5% to as high as 45%. The high rubber containing materials can, of course, be blended back with free styrene/acrylonitrile resin made by emulsion, mass or bead polymerization to a lower rubber level, if desired. Of course, copolymers based on other monomers, e.g., $\alpha$-methyl styrene/acrylonitrile

TABLE I

| | AMOUNT (IN GRAMS) | | | | | | | |
|---|---|---|---|---|---|---|---|---|
| | Examples | | | | | | | |
| Materials | 1 | 2 | 3 | 4 | 5 | 6 | 7 | 8 |
| SPS spine | 15 | 13 | 13 | 11 | 9 | 14 | 13 | 13 |
| Styrene | 59.5 | 61 | 61 | 63.7 | 61 | 58.5 | 61 | 59.2 |
| Acrylonitrile | 25.5 | 26 | 26 | 27.3 | 30 | 27.5 | 26 | 27.8 |
| Sunthene 250 | 3 | 3 | 0 | 3 | 3 | 0 | 3 | 3 |
| Acetic Acid | 0 | 0 | 0 | 0 | 0.3 | 0 | 0 | 0 |
| Dicumyl peroxide | 0 | 0 | 0 | 0.02 | 0.05 | 0 | 0.05 | 0.05 |
| Mixed tertiary mercaptans | 0.48 | 0.38 | 0.40 | 0.40 | 0.40 | 0.55 | 0.38 | 0.40 |
| Di-tridecylthiodipropionate | 0.45 | 0.52 | 0.60 | 0.60 | 1.20 | 0.6 | 1.2 | 1.2 |
| Naugawhite® | 0.15 | 0.18 | 0.20 | 0.20 | 0.40 | 0.2 | 0.4 | 0.4 |
| t-butyl peroxypivalate | 0.20 | 0.15 | 0.20 | 0.20 | 0.18 | 0 | 0.18 | 0.18 |
| Lauroyl peroxide | 0 | 0.05 | 0 | 0 | 0.09 | 0 | 0.09 | 0.09 |
| t-butyl peroxyneodecanoate | 0 | 0 | 0 | 0 | 0 | 0.28 | 0 | 0 |
| 0.24% Suspending solution (.10% Elvanol 50-42, 0.08% NaCl and 0.06% Sulframin 45s) | | | | | 200 | | 200[2] | |
| 0.06% Suspending solution (0.45% Natrosol 250HR and 0.15% EDTA.Na$_2$) | 200 | 200[1] | 200 | 200 | | 200 | | 200 |

[1]Used 0.3% concentration of suspending agents.
[2]Used 0.42% concentration of suspending agents.

The latex suspension runs of Examples 2-8 were conducted in the same way as described above for Example 1. While the differences in the recipes is set forth in Table 1, it is appropriate to point out that Example 2 was run at 13% total rubber while Example 4 was run at 11% total rubber.

In Example 5, a small amount of acetic acid was added to improve the efficiency of the mixed tertiary mercaptans in regulating the molecular weight. In this copolymer can be used in this back-blending.

As can be seen from the drawing, the rubber particles of the SPS spine undergo, as a result of the latex suspension polymerization, an agglomeration whereby no more than 50% of the particles are less than 0.07$\mu$ in diameter and at least 85% of the particles are between 0.04 and 0.25$\mu$; with at least about 95% between 0.04 and 0.30$\mu$ and at least about 98% between 0.04 and 0.40$\mu$ in diameter.

TABLE II

| PROPERTIES OF ABS PRODUCED BY LATEX SUSPENSION USING SPS SPINE | | | | | | | | |
|---|---|---|---|---|---|---|---|---|
| | Examples | | | | | | | |
| Test | 1 | 2 | 3 | 4 | 5 | 6 | 7 | 8 |
| ⅛" NI 73° F. ft.lbs./in.notch(A) | 8.1 | 7.8 | 6.0 | 5.7 | 5.7 | 5.6 | 10.6 | 10.1 |
| ⅛" NI (−20° F.) ft.lbs./in.notch(A) | 2.8 | 3.1 | 1.7 | 1.8 | 1.6 | 1.3 | 6.8 | 4.2 |
| Hardness (Rockwell R) (B) | 103 | 105 | 105 | 107 | 110 | 99 | 101 | 108 |
| Heat Distortion Temp. (° F.) (C) | 209 | 207 | 207 | 208 | 208 | 205 | 204 | 208 |
| 350° F. Mooney Viscosity (D) | 67 | 65 | 56 | 60 | 47 | 61 | 74 | 76 |

(A) Notched Izod - ASTM D-256
(B) Hardness (Rockwell R) - ASTM D-785
(C) Heat Distortion Temperature - ASTM D-684
(D) Mooney Viscosimeter - a rotational instrument which measures the torque required to revolve a rotor at constant speed in a sample of the polymer at constant temperature. Reference: M. Mooney; Ind. Eng. Chem. (Anal. Ed.) 6, 147 (1934).

example, the suspending solution was based on Elvanol 50-42 (87-89% partially hydrolyzed polyvinyl alcohol; du Pont).

Example 3 was run without the aromatic oil (Sunthene 250).

Example 6 was run with a different peroxy ester catalyst (initiator), i.e., t-butyl peroxyneodecanoate, to illustrate the fact that various catalysts may suitably be used. Examples 7 and 8 are substantially similar to each other except that Example 7 uses a PVA based suspending solution and Example 8 uses a Natrosol based suspend-

COMPARATIVE EXAMPLE

This example demonstrate that an ABS having poor mechanical properties is obtained when a SPS spine is used in a standard emulsion polymerization process.

| PREPARATION OF SPS SPINE STYRENE-ACRYLONITRILE 50/50 GRAFT | | |
|---|---|---|
| Material | Amount | |
| Water | 180 | gm. |
| SPS Spine latex[1] | 50 | gm. (based on solids) |
| Styrene | 35 | gm. |

-continued

PREPARATION OF SPS SPINE STYRENE-ACRYLONITRILE 50/50 GRAFT

| Material | Amount | |
|---|---|---|
| Acrylonitrile | 15 | gm. |
| Dresinate 731[2] | 2.45 | gm. (based on 100% solids) |
| NaOH | 0.074 | gm. |
| K$_2$S$_2$O$_8$ | 0.3 | gm. |

[1] SPS spine same as used in Example 1.
[2] Emulsifying agent (Hercules, Inc.) - sodium soap of a modified resin (abietic acid) derived from tree rosin.

PROCEDURE

The latex spine is weighed out and placed in the reactor which is blanketed with nitrogen while agitating the reactor. A soap solution was made from 140 ml. water, 2.45 gms. of Dresinate 731 and 0.074 gm. NaOH with slight warming to dissolve the soap. 42.5 gms. of the solution are added to the reactor and the remainder is placed in a dropping tunnel. The monomers were weighed out and placed into a second dropping funnel. The K$_2$S$_2$O$_8$ was added to the remaining water and the mixture was added to the reactor at 150° F. The monomers and the soap solution were added dropwise into the reactor over a period of 1.5-2 hours. The mixture was allowed to stand overnight, after which the % solids were obtained to determine the extent of conversion. The thusly obtained graft latex was then flocced in a 2% MgSO$_4$ solution at 200°-205° F, filtered, washed and dried at 150° F overnight. The dried 50/50 graft was back blended with a styrene-acrylonitrile resin (intrinsic viscosity in dimethyl formamide at 30° C=0.9-1.1) to a 22% total rubber level. That is, the final product consisted of 44 gms. of the 50/50 graft and 56 gms. of the styrene-acrylonitrile resin.

The mechanical properties of this product are as follows:

| | |
|---|---|
| ⅛" NI (RT) ft lbs/in notch | 0.87 |
| ⅛" NI (−20° F) lbs/in notch | 0.54 |
| Hardness (Rockwell R) | 100 |
| Heat Distortion Temperature (° F) | 206 |
| 350° F Mooney | 66 |

The above data on the mechanical properties illustrate the poor impact strength obtained even at a 22% rubber level.

Variations can, of course, be made without departing from the spirit and scope of the invention.

Having thus described our invention, what I desire to secure by Letters Patent and hereby claim is:

1. A composition consisting essentially of a polyblend of
    a. a matrix of a copolymer of from about 60-80% of a monovinylidenic aromatic hydrocarbon and from about 20-40% of an ethylenically unsaturated nitrile monomer; and
    b. a graft copolymer comprising a graftable rubber substrate made up of a cross-linked small particle size spine of a styrene/butadiene rubber wherein the ratio of styrene to butadiene is from about 31 to 69 to 0 to 100, and grafted onto said substrate, a superstrate which is a copolymer comprising a monovinylidene aromatic hydrocarbon and an ethylenically unsaturated nitrile, the degree of grafting, which is defined as the ratio of the weight of the grafted copolymer to the weight of the substrate, being between about 0.3 and 1.3; said substrate constituting about 5 to 45% by weight of the total composition and being in the form of particles at least 85% of which have a number average particle size less than 0.14$\mu$, said composition being formed by suspension polymerizing said substrate with from 55-95% of at least one monoethylenically unsaturated monomer in a suspending solution in an oxygen free atmosphere at a temperature of about 105°-250° F. in the presence of a catalytically effective amount of at least one polymerization initiator selector from the group consisting of peroxide initiators and azo initiators, at least one chain transfer agent and an antioxidant.

2. A composition according to claim 1, wherein the copolymer forming the matrix is a 70/30 styrene/acrylonitrile copolymer, the ratio of styrene to butadiene in the cross-linked small particle size spine is between 10/90 and 0/100 and the degree of cross-linking thereof is about 80-90%, the degree of grafting is about 0.5-1.0 and the substrate constitutes about 9-18% of the total composition.

3. A composition according to claim 1, wherein said substrate constitutes about 7 to 18% by weight of the total composition.

4. A composition according to claim 1, wherein the degree of grafting is between about 0.5 and 1.0.

5. A composition according to claim 1, wherein the cross-linked small particle size spine is about 50-98% cross-linked.

6. A composition according to claim 5, wherein the degree of cross-linking is about 80-90%.

7. A composition according to claim 1, wherein the copolymer comprises about 70% of the monovinylidenic aromatic hydrocarbon and about 30% of the ethylenically unsaturated monomer.

8. A composition according to claim 7, wherein the monovinylidenic aromatic hydrocarbon is styrene and the ethylenically unsaturated monomer is acrylonitrile.

9. A composition according to claim 1, wherein the styrene-butadiene rubber comprises 0-10% styrene and 90-100% butadiene.

* * * * *

UNITED STATES PATENT AND TRADEMARK OFFICE
CERTIFICATE OF CORRECTION

PATENT NO. : 4,042,647
DATED : August 16, 1977
INVENTOR(S) : Robert J. Cornell

It is certified that error appears in the above-identified patent and that said Letters Patent are hereby corrected as shown below:

Column 10, lines 19-20, change "at least one monoethylenically unsaturated monomer" to --a monovinylidene aromatic hydrocarbon and an ethylenically unsaturated nitrile.--

Signed and Sealed this

Eleventh Day of July 1978

[SEAL]

Attest:

RUTH C. MASON
Attesting Officer

DONALD W. BANNER
Commissioner of Patents and Trademarks